United States Patent
Krasnov et al.

(10) Patent No.: US 8,613,586 B2
(45) Date of Patent: Dec. 24, 2013

(54) VORTICAL WIND ENERGY APPARATUS

(75) Inventors: Yuriy Konstaninovich Krasnov, Richmond Heights, OH (US); Dmitry Gennadievich Yankelevich, Moreland Hills, OH (US)

(73) Assignee: Qualitics, Inc., Cleveland, OH (US)

( * ) Notice: Subject to any disclaimer, the term of this patent is extended or adjusted under 35 U.S.C. 154(b) by 1093 days.

(21) Appl. No.: 12/586,337

(22) Filed: Sep. 21, 2009

(65) Prior Publication Data

US 2011/0070071 A1    Mar. 24, 2011

(51) Int. Cl.
*F03D 7/06* (2006.01)

(52) U.S. Cl.
USPC .............................. 415/4.2; 415/4.4; 415/907

(58) Field of Classification Search
USPC ................. 415/4.2, 4.4, 23, 30, 33, 909, 907; 416/9, 16
See application file for complete search history.

(56) References Cited

U.S. PATENT DOCUMENTS

| | | | | |
|---|---|---|---|---|
| 964,374 | A * | 7/1910 | Bey | 415/4.2 |
| 3,902,072 | A * | 8/1975 | Quinn | 290/44 |
| 3,938,907 | A * | 2/1976 | Magoveny et al. | 415/141 |
| 3,944,840 | A * | 3/1976 | Troll | 290/55 |
| 4,047,834 | A * | 9/1977 | Magoveny et al. | 415/53.1 |
| 4,508,973 | A * | 4/1985 | Payne | 290/55 |
| 7,824,060 | B2 * | 11/2010 | Pelken et al. | 362/183 |

FOREIGN PATENT DOCUMENTS

WO    WO 2010098656 A2 *    9/2010

* cited by examiner

*Primary Examiner* — Edward Look
*Assistant Examiner* — Aaron R Eastman (57) ABSTRACT

A vortical energy wind apparatus translates wind gusts to vertical air streams that disrupt the streams of air in the atmosphere that pose high tornado-risks. The apparatus comprises a lower half-spheroid part and an upper half-spheroid part both placed by their convexities to each other. A toroidal-shaped axial-symmetric core has a set of curved blades attached to the core. Streams of air penetrate a rotary wheel inside it, and the blades attached to the core rotate the wheel. Essentially, the upper part acts like an upside-down wing at streamlining the wind and an exit hole centered at a top of the upper part provides means for the vortical stream of air to leave the apparatus.

21 Claims, 8 Drawing Sheets

VORTICAL WIND ENERGY APPARATUS

This Non-provisional (Utility) Patent Application claims priority under U.S. Provisional Patent 61/100,566 filed Sep. 26, 2008.

BACKGROUND OF THE INVENTION

1. Field of the Invention

The present invention relates generally to an apparatus for and a method of generating a vertical stream of air with a predefined and regulated vorticity.

2. Description of the Related Art

Thirty years ago, new phenomena in hydrodynamics forced a reexamination of the entire approach to the efficacy problem in stream energy-conversion processes. The central problem was to overcome the losses of energy on turbulence. The solution was found in a study of laminar flow, which is based on the premise that fields of velocity of any stable flow are determined in local if the source of energy, the boundary walls, and the free surfaces are all known. It was concluded that a continuous medium guarantees streamlines of flow; therefore, certain stream machines were projected and created.

A formula for a stationary tornado stream was discovered in 1986 to describe laminar circular rotation of outlaying flow of viscous fluid. The formula promoted further development of technologies to enclose tornadoes into tornado chambers, also known as the tornado-stream technique. Certain boundary walls are chosen, s. a., hyperboloids, that outlay flows through the areas created therein. Entrance and exit surfaces normal to the axis of symmetry are specific features of these chambers that effect the flow of working fluids.

The present invention is a novel tornado-stream chamber: natural wind gusts enter the chamber between a lower half-spheroid part and an upper half-spheroid part that are placed by their convexities towards each other. The wind stream flows upwards through the boundary walls created by a toroidal-shaped axial-symmetric core and hyperbolic inner surface of the half-spheroid upper bowl. Essentially, the upper part acts like an upside-down wing at streamlining the wind. The wind exits the apparatus through the hole centered at the top of upper half-spheroid part of the apparatus.

The present invention solves a long-felt need for a type of tornado-stream chamber that converts wind gusts to vertical air streams that are able to disrupt streams of air in the atmosphere that pose high tornado-risks.

SUMMARY OF THE INVENTION

It is an object of the present invention to teach a method of deliberately injecting a stream of air in the atmosphere to decrease the existing natural vorticity of ambient air.

It is an object of the present invention to reduce the natural vorticity of the atmosphere to prevent a creation of tornadoes, even under powerful thermics.

It is an object of the present invention to alter the local area of atmosphere in vicinity and along a path of a convective storm (or even a solitaire tornado) already created by moving vortical cell with internal vorticity.

It is an object of the present invention to teach means to generate a vertical stream of air with predefined and controlled vorticity.

It is an object to utilize only natural wind as a source, a supply and a cause of the invention. It is an object that placement of the herein-disclosed-apparatus for direct interaction with the wind is all that is required for it to function.

It is an object of the present invention to provide a possibility to utilize wind energy in form of energy of an electric current due to build-in use of appropriate mechanical electrogenerator.

It is an object of the present invention that a shape of the present apparatus does not depend on the direction in which wind travels; rather, wind in any directions on each given horizon equally interacts with said apparatus.

It is envisioned that a vortical wind energy apparatus converts wind gusts into a vertical air streams that disrupt the streams of air in the atmosphere that pose high tornado-risks. The apparatus comprises a lower half-spheroid part and an upper half-spheroid part placed by their convexities towards each other. A toroidal-shaped axial-symmetric core has a set of curved blades attached to it. Streams of air penetrate a rotary wheel inside toroidal shaped axial-symmetric hole, and the blades attached to the core rotate the wheel. The upper part acts like an upside-down wing at streamlining the wind. The wind exits the apparatus through the hole centered at the top of upper half-spheroid part of the apparatus.

BRIEF DESCRIPTION OF THE DRAWINGS

Advantages and features of the present invention are better understood with the reference to the following more detailed description and claims taken in conjunction with accompanying drawings, in which like elements are identified with like symbols.

DESCRIPTION OF THE PREFERRED EMBODIMENTS

The best mode for carrying out the invention is presented in terms of its preferred embodiment, herein depicted within the Figures.

1. Detailed Description

Figure 1:
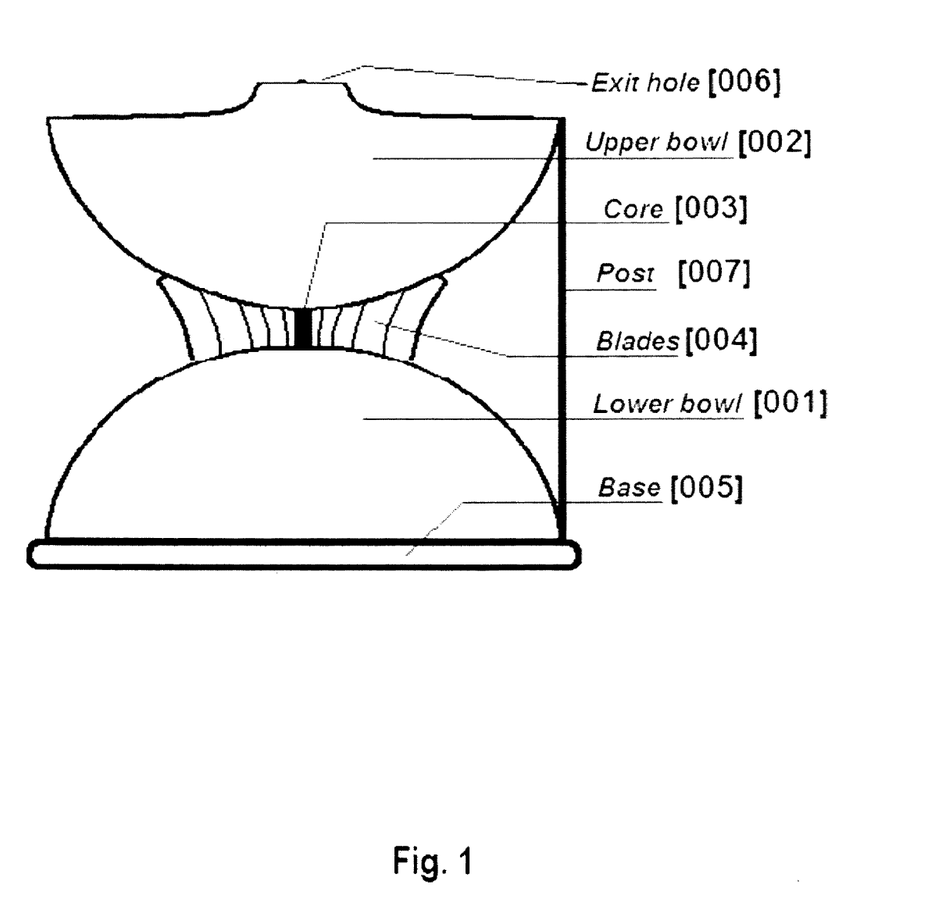
FIG. 1 shows a frontal exterior view of vortical wind energy apparatus with a single post comprising two major half-spheroid parts and a rotary wheel between them.

A preferred embodiment of an apparatus' and methods main functionality is to transform blowing wind into a whirled vertical stream is described herein in accordance with the present invention. The present apparatus shown in FIG. 1 is a vortical wind energy system that consists of two major half-spheroid parts: a lower bowl 001 and an upper bowl 002 that are placed by their convexities towards each other. These bowls 001, 002 are furthermore distanced from each other at some certain height by at least one post 007.

Figure 2:
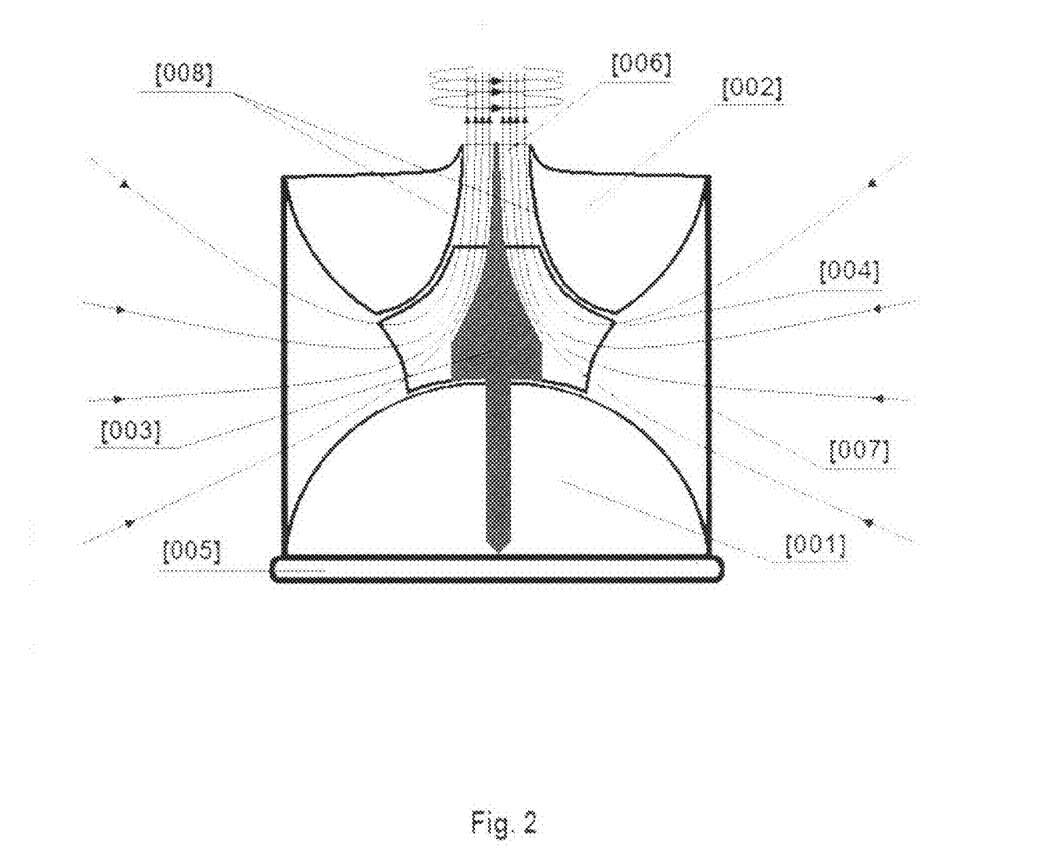
FIG. 2 shows the central vertical cross-section of the wind energy apparatus with two symmetrical posts; inner hyperbolic curved cylindrical wall [008] completes bordering of a toroidal shape of upper half-spheroid bowl of apparatus (the cross-section area of this toroidal shape is marked [002]); the core [003] with blades attached matches by its form a created toroidal shaped axial-symmetric hole, which in its turn is a channel for propagation of the stream of air (shown by arrowed curved streamlines)

The axial cross-section of the upper bowl 002 comprises a toroidal structure, shown in FIG. 2. An axial-symmetrical internal wall 008 creates a toroidal topology of the entire upper bowl 002. An axial-symmetric core 003 comprises a set of properly shaped, curved blades 004 along the symmetry axes of the entire apparatus.

In the first embodiment, the core 003 is fixed to the base and is not capable of rotating. In another embodiment, the core 003 is extended inside the lower bowl 001. In the latter embodiment, the set of curved blades 004 is attached to the core and take up the area above the lower bowl 001. In this embodiment, the core 003 is centered by the proper holder (not shown), or it is supported by appropriate gears (refer to FIG. 3) that allow the core 003 to rotate freely. The core system 003 and attached blades 004 together comprises the rotary wheel. In embodiments where the core 003 with blades 004 attached is centered and supported by the gear mechanism the apparatus can transform part of the energy of the wind into the kinetic energy of the rotating wheel.

Due to the symmetrical shape of the device, streams of air will penetrate a rotary wheel inside. The shape of the device does not limit the stream of air to be delivered from any direction from which the wind is blowing, moreover, the stream of wind can penetrate the device from all directions. The air leaves the apparatus through exit hole 006 centered at the top of the upper bowl 002 in a form of a vertical whirled jet. The streamlines of wind are shown in FIG. 2 as arrowhead lines.

The upper bowl 002 acts like an upside-down wing at streamlining the wind. There is an anti-lift effect occurring to friction. The anti-force pushes the upper bowl 002 down toward the base 005 of the apparatus. It is important, however, that the base has the maximal possible area of foothold; it makes the device very stable in regard to the efforts to turn it over.

The apparatus namely transforms wind into a whirled vertical stream with a certain direction of the vector of circulation and a certain vorticity. In certain embodiments, s. a., those having cores supported by gears, this transformation can be accompanied by transformation of energy of the wind into electricity. The present apparatus is capable of being transformed into an electricity-generating wind machine.

Figure 3:
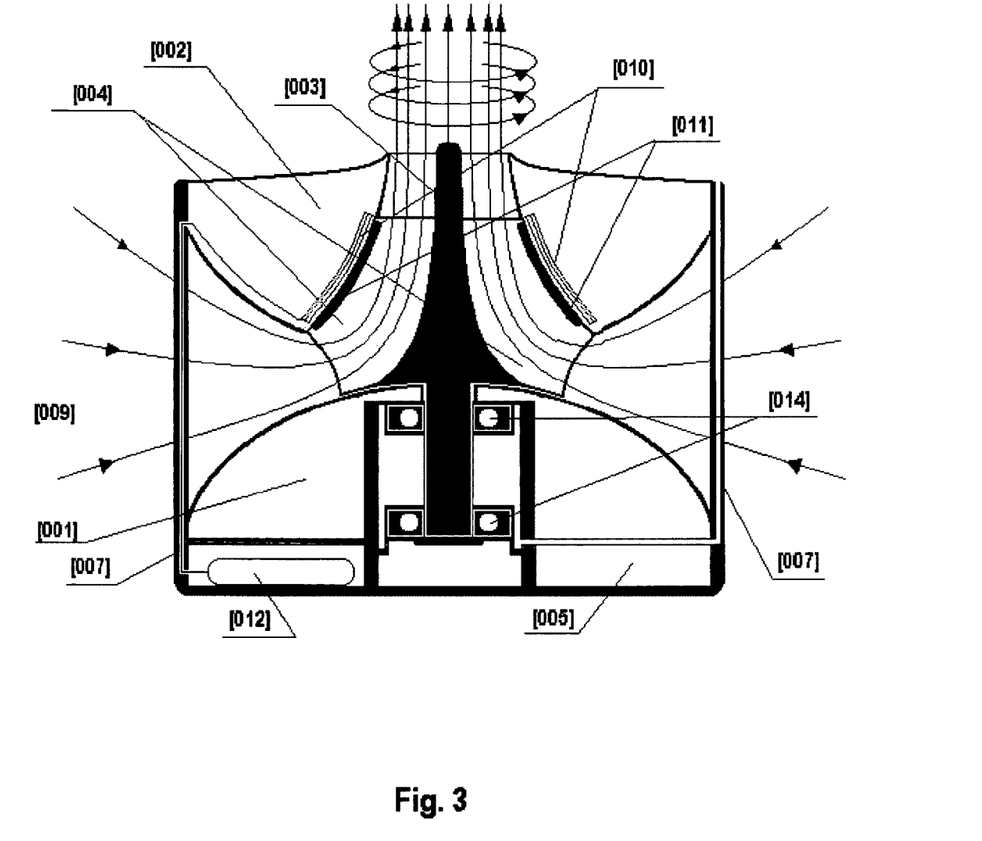
FIG. 3 shows another embodiment of the energy system, wherein it is further embodied to generate electricity.
Figure 4:
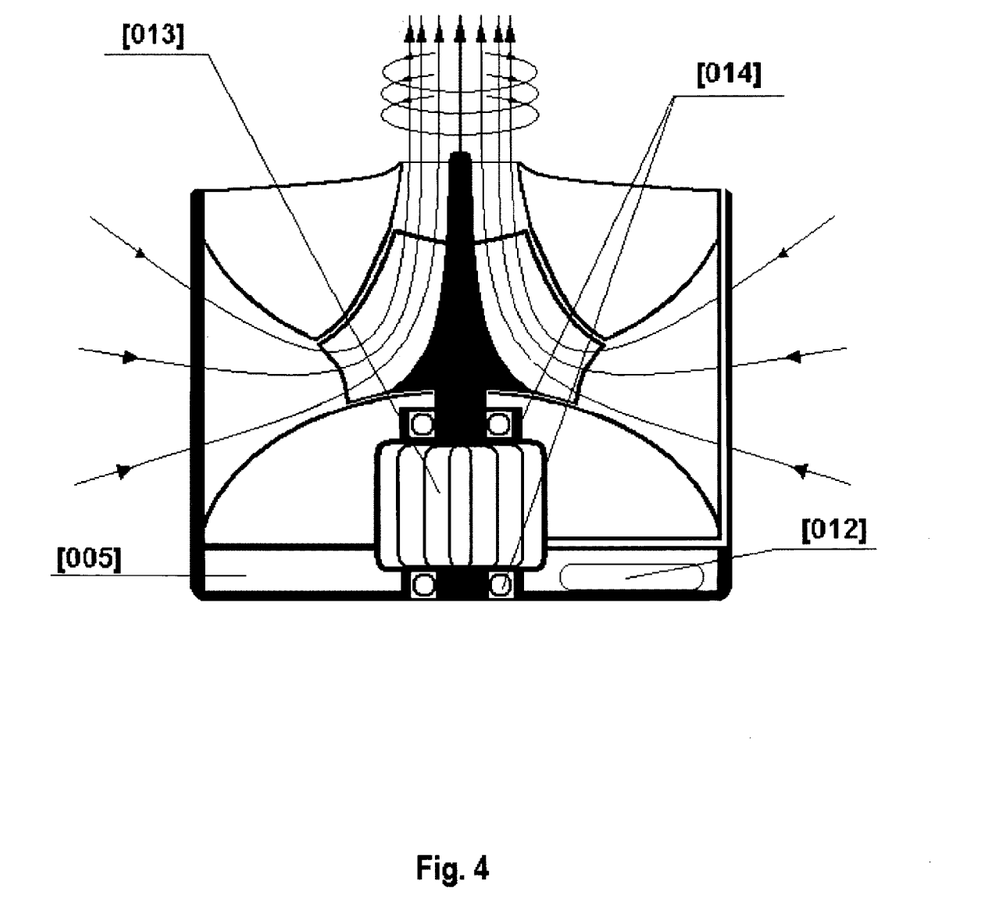
FIG. 4 shows schematics of a system that generates electricity into an electromechanical generator.

The electricity generating wind embodiment of the present invention is shown in FIGS. 3 and 4. FIG. 3 shows schematics for generation of electricity into a coil 010 attached to the wall of the toroidal shaped axial-symmetric hole in the upper bowl 002. The coil is affixed to bowl 002 and permanent magnets are attached to the distal ends of the rotating blades 004. At least one post is used to route electric wires to conduct electricity to an electronic connector 012 which is connected to an outside grid. The other post is used to fill the gear mechanism with a lubricant.

The special electronic connector 012, which is placed into the base 005 or directly into the bowl 001, or 002, provides means to transform the frequency of the generated electricity directly to the value of frequency that matches the frequency of the local electric grid. The gear mechanism 009 supports the core 003 and allows the rotary wheel to rotate freely.

FIG. 4 shows an embodiment where the rotary wheel is attached directly to some standard electro-mechanical generator, which transforms the kinetic energy of said wheel into the electric current.

The method of the present invention is based on elimination of the vorticity in the atmosphere of tornado-watch areas, i.e. those areas on the path of so-called vortical cells. It is anticipated that even at unavoidable "master" ascending updraft streams, these streams will be unable to form tornadoes due to mechanisms of the intensification of vorticity if there is not enough excessive vorticity in the atmosphere to create the tornado.

Thus having apparatuses that generate the vorticity in the atmosphere, which is decreasing already existing internal vorticity of this atmosphere the method follows to disperse a dense distribution of vortical wind energy apparatuses all over tornado-risk regions. Implementation of the plurality of devices eliminates air vorticity on paths of vortical cells; hence, apparatuses are needed that regulate also the rates of vorticity. The curvature of the blades of the rotary wheel must therefore be regulated.

Figure 5:
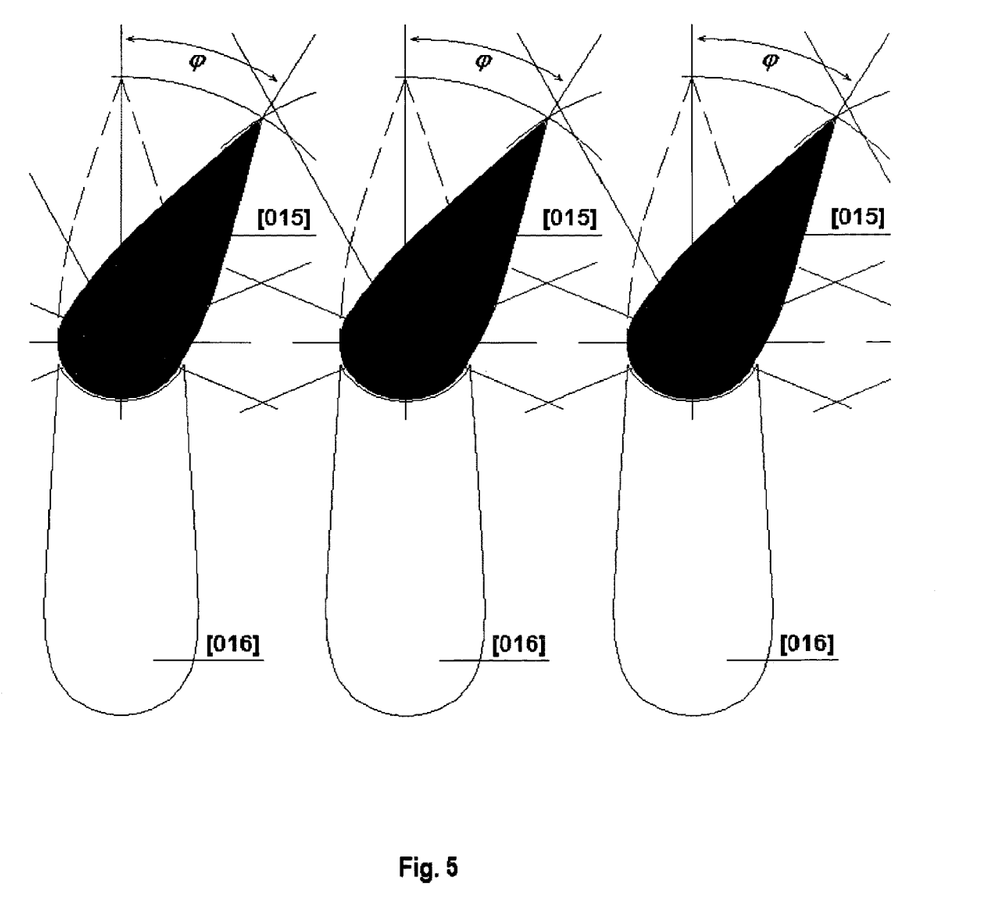
FIG. 5 shows a fragment of a plurality of the blades of a rotary wheel with a changeable geometry.
Figure 6:
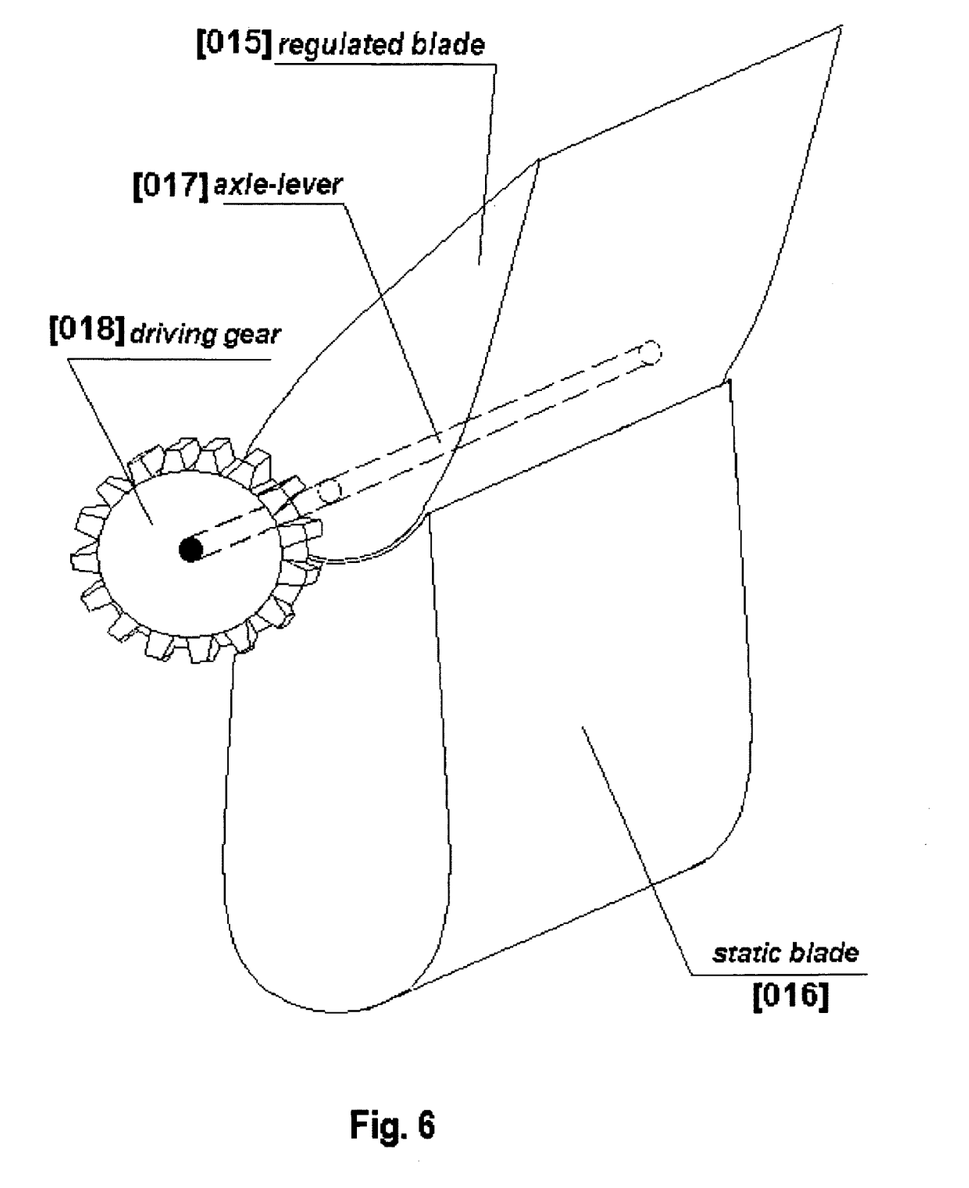
FIG. 6 shows a mechanism that provides means for an optimal rotation of the blade.
Figure 7:
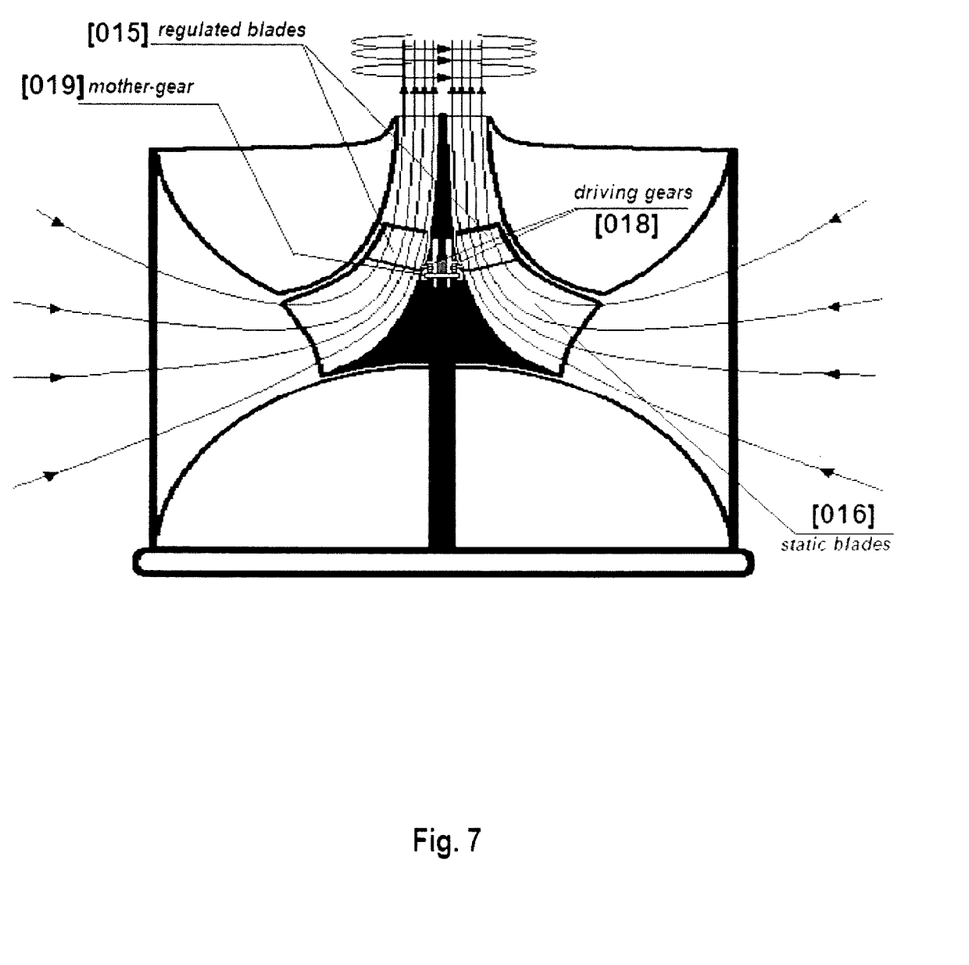
FIG. 7 shows static blades securely attached to the core of the blade wheel and the regulated blades with changeable slope; and, FIG. 8 shows implementation of a Watt's regulator attached to the core of FIG. 7.

FIG. 5 shows a fragment of three blades 004 of the rotary wheel in a linear configuration. Each blade is composed of two parts: the regulated blade 015, which is the upper part of the whole blade; and, the static blade 016, which is the lower part. The regulated blade 015 rotates with respect to the static blade within a maximal angle $\phi$ in both directions: clockwise and counter-clockwise. A mechanism capable of providing the foregoing is shown in FIG. 6. The static blade 016 is attached to the core of the rotary wheel (not shown in FIG. 6). The regulated blade 015 does not touch any walls, but has axle lever 017 where it ends with a driving gear 018. FIG. 7 shows a mechanical system that regulates the slope of the regulated blade 015 in respect to the static blade 016. As is shown in FIG. 7, all static blades 016 are solidly attached to the core 003 of the blade wheel, and all regulated blades 015 do not touch the core; rather, axle-levers 017, which are compressed into all regulated blades 015 extend into an empty space in the core. Distal ends of all said axle-levers 017 have the driving gears 018 that are laying on the same mother gear 019 and are connected with the mother gear through toothed gearing. If the mother gear 019 turns on some angle in its horizontal plane, all regulated blades driving gears turn on some angle simultaneously, so that just described mechanism allows the user to change the slope of all regulated blades 015 with respect to the static blades 016.

Moreover, the proposed mechanism provides an automatic stabilization of the rotating speed of the rotary wheel. Contemporary technologies provide for a plurality of possible means to stabilize rotation of the blade wheels. The most preferable, natural, and reliable means does not require or involve any other energy source except the wind that rotates the blade wheel.

Figure 8:
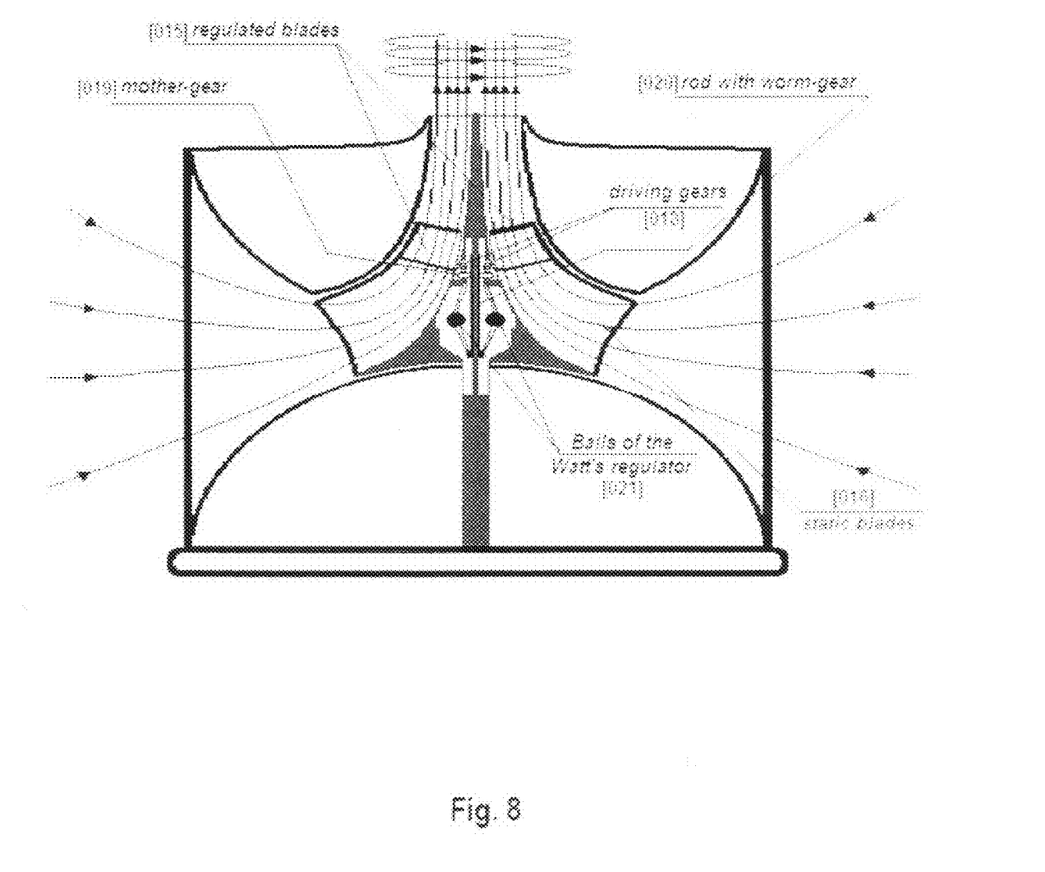

FIG. 8 shows means to rotate the mother gear 019 and, correspondingly, means to regulate the slope of the regulated blades 015 with respect to the static blades 016. Particularly, the foregoing is accomplished by means of a rod with worm-gear that is connected with the mother gear 019. As the rod with worm-gear 020 moves upward, the mother gear 019 rotates clockwise. As the rod 020 moves downwards, the mother gear 019 rotates counter-clockwise.

2. Operation of the Preferred Embodiment

In operation, it is anticipated that at an initial state, there is no wind to rotate the blade wheel of the apparatus. All the regulated blades 015 are at a maximum angle of slope with respect to the static blade 016.

When the wind starts blowing, the blade wheel starts to rotate. The Watt's regulator follows this rotation so that its balls 021 gradually move off of each other and correspondingly push up the rod 020. The rod 020 gradually turns the mother gear 019 and, consequently, decreases the angle of slope between the regulated 016 and static blades 015 of the blade wheel. It decreases the rate at which the wind passes a torsion moment to the wheel.

When the wind reaches its maximum, yet constant, speed ("$V_{wind}$"), the rotation of the blade wheel reaches its stationary value ("$W_{stat}$"). So that balls 021 of the Watt's regulator rotate at a stationary angular velocity, the distance between them remains the same: the rod 020 maintains the same height; the mother gear 019 stays in the same position; and, the angle of slope between the regulated and static blades 015 and 016 remains the same.

To achieve the foregoing operation, the Watt's regulator provides for an automatic negative, reverse tie relationship for the wind speed and the blades' slope, which provides for $W_{stat}$ having reliable stability with respect to and/or considering the wide range of variable wind speeds.

Indeed, when the wind speed $V_{wind}$ decreases in the foregoing stationary stage, the Watt's regulator consequently pushes the rod 020 down. When the rod 020 goes down, the mother gear 019 rotates in a counter-direction that increases the slope of the regulated blades 015, so that the wind's ability to pass the torsion moment of the rotary wheel increases. Contrary, increases in the wind speed $V_{wind}$ during this stationary stage: the Watt's regulator consequently pushes the rod 020 down, which leads to a decrease in the slope of the regulated blades 015 and a decrease of the wind's ability to pass the torsion moment of the rotary wheel.

With respect to alternate apparatus embodiments that generate electricity, regulated blades 015 require permanent magnets 011 to be placed at the distal ends of static blades 016 (see FIG. 3). This placement also concerns the electric coil 010, that are fixed vis-à-vis on the inner hyperbolic curved cylindrical wall [008].

The foregoing descriptions of specific embodiments of the present invention are made for purposes of illustration and description. They are not intended to be exhaustive or to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by the following exemplary claims nor by any possible, adverse inference under the rulings of *Warner-Jenkins Company*, v. *Hilton Davis Chemical*, 520 US 17 (1997) or *Festo Corp*. V. *Shoketsu Kinzoku Kogyo Kabushiki* Co., 535 U.S. 722 (2002), or other similar case law or subsequent precedent should not be made if such claims are amended subsequent to this Non-provisional (Utility) Patent Application.

Having thus described the invention what is claimed as new is as follows:

1. A vortical wind energy apparatus that translates wind gusts to vertical air streams, comprising:
   an upper half-spheroid part; said upper half-spheroid part has a toroidal structure that is formed by external spheroid surface of it and hyperbolic axial-symmetric inner surface of it; conjunction of said two surfaces creates a toroidal shaped axial-symmetric hole inside said upper half-spheroid part;
   a lower half-spheroid part; said lower half-spheroid and said upper half-spheroid are placed by their convexities towards each other in a spaced apart manner thereby allowing passage of air therebetween; and
   a core with blades attached and capable to rotate around the vertical axis of symmetry within said toroidal shaped axial-symmetric hole.

2. The apparatus of claim 1, further comprising at least one post distancing said lower part and said upper part.

3. The apparatus of claim 1, further comprising at least two curved blades along symmetric axes of said apparatus and attached to the said core.

4. The apparatus of claim 1, wherein said core is fixed to a base and is not capable of rotating.

5. The apparatus of claim 1, wherein said core penetrates inside said lower part, and wherein a set of curved blades is attached to the core in an area above said lower part.

6. The apparatus of claim 5, wherein said core is centered and supported by appropriate gears that allow said core to rotate freely.

7. The apparatus of claim 5, wherein said core is centered and supported by appropriate rotor of the common industry used electromechanical generator that allow said core to rotate freely together with said rotor.

8. The apparatus of claim 5, wherein streams of air will penetrate the toroidal shaped axial-symmetric hole and interact with blades that are attached to said core and rotate said core.

9. The apparatus of claim 1, wherein an upper half-spheroid part acts like an upside-down wing at streamlining by the wind, wherein usual aero-dynamic force pushes said upper bowl down toward a base of said apparatus.

10. The apparatus of claim 1, further capable of transforming wind energy into electricity, wherein said apparatus further comprises a coil attached to a wall of a conic hole in said upper part, and said coil is under action of the magnetic field that is created by permanent magnets that are attached to distal ends of rotating blades.

11. The apparatus of claim 3, wherein each of said blades comprises two parts:
    a regulated blade as an upper part of said blade; and,
    a static blade as a remaining the lower part.

12. The apparatus of claim 11, wherein said regulated blade can rotate with respect to said static blade within a maximal angle φ in both clockwise and counter-clockwise directions.

13. The apparatus of claim 12, wherein said regulated blade contains an axle lever that ends with a driving gear.

14. The apparatus of claim 11, further comprising a means to regulate a slope of said regulated blade with respect to said static blade, wherein said static blades are securely attached to said core of said blade wheel, and said regulated blades do not touch said core.

15. The apparatus of claim 14, wherein axle-levers attached to said regulated blades penetrate an empty space in said core, and wherein distal ends of all said driving gears lay on a mother gear, wherein said driving gears are connected to said mother gear through toothed gearing.

16. The apparatus of claim 13, wherein said regulated blades can simultaneously turn on an angle when said mother gear turns on some angle in its horizontal plane, allowing a slope of said regulated blades to be changed with respect to the static blades.

17. The apparatus of claim 16, further comprising a means to rotate said mother gear and correspondingly regulate the slope of regulated blades with respect to static blades, said means comprises a rod with worm-gear that is connected with said mother gear such that said mother gear rotates clockwise if rod with worm-gear moves upward and counter-clockwise if rod with worm-gear moves downward.

18. The apparatus of claim 17, wherein said regulated blades are at a maximum angle of slope with respect to said stable blades when there is no wind to rotate said blade wheel of said apparatus, wherein wind is able to pass said blade wheel at a maximum available torsion moment.

19. The apparatus of claim 18, wherein said blade wheel rotates when the wind blows with a given speed, a Watt's regulator further comprised on said apparatus follows the rotation so that its balls gradually move off of each other and correspondingly push up rod with worm-gear, said worm-gear gradually turns said mother gear and, consequently, decreases an angle of slope between regulated and static blades of said blade wheel.

20. The apparatus of claim 18, wherein a rotation of said blade reaches a stationary value when the wind reaches its maximum, yet constant, speed so that balls of the Watt's regulator comprised on said apparatus rotate at a stationary angular velocity, and a distance between said balls remains the same;

wherein said rod with worm-gear maintains a same height;

wherein said mother gear stays in a same position; and, said angle of said slope between said regulated and said static blades remains same.

21. The apparatus of claim 18, wherein decreases in the wind speed cause said Watt's regulator to push said rod with worm-gear down, and said mother gear then rotates in a direction that increases said slope, wherein increases in the wind speed cause said Watt's regulator to push said rod with worm-gear upward and said mother gear rotates in a counter-direction to decrease said slope.

* * * * *